(12) United States Patent
Moeller et al.

(10) Patent No.: US 7,134,926 B2
(45) Date of Patent: Nov. 14, 2006

(54) DEVICE AND METHOD FOR DISSUADING PREDATORS THROUGH STARTLE RESPONSE INSTINCT

(76) Inventors: Klaus Moeller, 740 Lomas Santa Fe, Suite 210, Solana Beach, CA (US) 92075; Robert Hurwitz, 3715 Ocean Front Walk, Marina Del Rey, CA (US) 90292

( * ) Notice: Subject to any disclaimer, the term of this patent is extended or adjusted under 35 U.S.C. 154(b) by 0 days.

(21) Appl. No.: 11/022,506

(22) Filed: Dec. 22, 2004

(65) Prior Publication Data
US 2006/0135010 A1    Jun. 22, 2006

(51) Int. Cl.
*A63B 31/08*    (2006.01)
(52) U.S. Cl. ............................................. 441/64
(58) Field of Classification Search ................. 441/64, 441/65; D2/731, 734; D21/808, 806, 804
See application file for complete search history.

(56) References Cited

U.S. PATENT DOCUMENTS

| | | | |
|---|---|---|---|
| 3,222,701 A | 12/1965 | Fest | |
| 3,428,978 A | 2/1969 | Johnson | |
| 3,477,074 A | 11/1969 | Bezanis | |
| 4,494,245 A | 1/1985 | Burkhead | |
| D278,569 S | * 4/1985 | Briggery Myles | ........... D2/734 |
| 5,261,847 A | * 11/1993 | Cox | ............................ 446/73 |
| 5,454,183 A | * 10/1995 | Antonini et al. | ................. 43/1 |
| 5,588,251 A | 12/1996 | Young | |
| D382,933 S | * 8/1997 | Foulke | ..................... D21/808 |
| D423,190 S | * 4/2000 | Castleberry, II | ............. D2/731 |
| 2003/0024156 A1 | * 2/2003 | Tinshey | ..................... 47/32.5 |

* cited by examiner

*Primary Examiner*—Stephen Avila
(74) *Attorney, Agent, or Firm*—Donn K. Harms

(57) ABSTRACT

An apparatus and method for dissuading predatory animals from attacking. The device and method employ depictions of an eye, especially the eye of a predator of the predatory animals, to initiate a startle response in the predatory animal thereby dissuading an attack. The depiction of one or more eyes may be placed on clothing or equipment carried into the aquatic or land based environment of the predator being dissuaded.

3 Claims, 6 Drawing Sheets

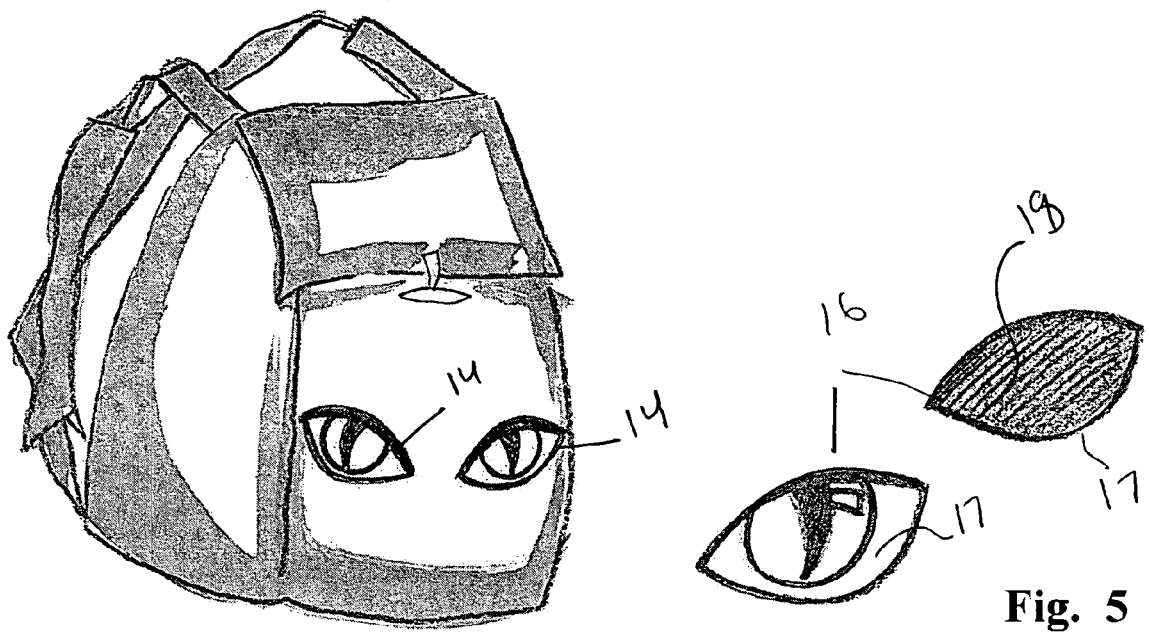
Fig. 10
Fig. 5
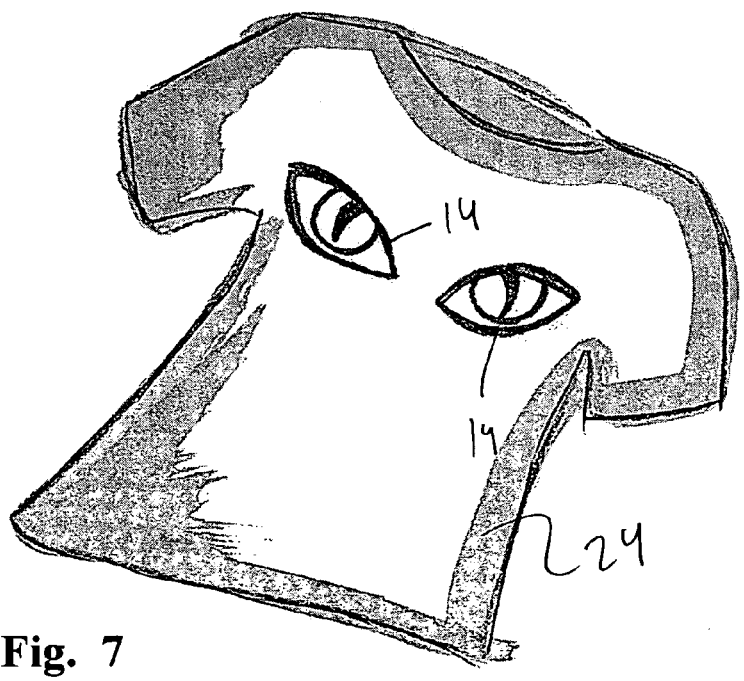
Fig. 7

DEVICE AND METHOD FOR DISSUADING PREDATORS THROUGH STARTLE RESPONSE INSTINCT

FIELD OF THE INVENTION

The invention herein disclosed consists of a device and a methodology related generally to the repelling of predatory animals by the use of startle response mimicry. The invention relates more particularly to methods for protecting men as they engage in marine and water activities from the predatory habits of sharks using the shark's natural startle response to the eyes of killer whales, which prey upon sharks. Combined with the described method of employment the invention is suitable for use to protect surfers, swimmers, bathers, scuba divers, sailors or other persons found to be isolated in shark infested waters. It is also suitable for protecting the persons, catch and equipment of fishermen. The construct can further be applied to any environment by identifying the desired predator to be deterred, determining and reproducing the most deterrent eye type for that species and then replicating the result through whatever means on sport specific items like swim fins, wetsuits, boogie boards, surfboards, swimsuits, and waders.

BACKGROUND OF THE INVENTION

As man continues to explore his environment, he often finds himself in confrontation with large and/or dangerous predatory animals, or animals which see man as nothing more than a possible meal or a territorial threat. Since man is himself basically a land animal, he is normally more than able to defend himself against other predatory land animals. It is only when he is isolated, injured, and/or unarmed does he began to be at any disadvantage such that land based predatory animals present any real and unmanageable danger. However, as man pushes the frontiers of his activities into hostile environments wherein he must have support equipment for survival except for momentary visits, where his size is not particularly intimidating, and where his mobility is relatively limited with respect to other animals in the environment, he often finds himself much more vulnerable and consequently more likely to be the next meal or the target of an attack of a predatory animal which is at home in the hostile environment. The ocean is, of course, a prime example of an environment in which man is at a drastic disadvantage in comparison to the native or aquatic organisms. If a man also finds himself injured, isolated, and unarmed in an unfamiliar or hostile environment such as the ocean, he is meagerly equipped to defend himself against the ocean's natural predators such as sharks, barracudas, etc. Often, Navy personnel, fishermen, other sailors and, most importantly, persons engaged in water sports at a beach often find themselves in unexpected situations. Consequently, it is an object of the present invention to provide a method of repelling predatory animals from a target organism or potential prey, such as man, and it is a specific object of this invention to provide a method of repelling predatory ocean animals like sharks from an individual in an ocean environment.

Over the years, there have been various ways man has dealt with certain types of particular predatory animals. Techniques for repelling sharks have ranged from the pathetic to the simply ineffective. Even today, certain Japanese fishermen rely on long red sashes to protect themselves from sharks, and Ceylonese pearl divers place confidence in shark charmers in the same manner as was recorded by Marco Polo in 1298.

In the past, it was believed or assumed by most scientists that sharks generally have very poor eyesight and hunt or operate substantially by means of their smell or olfactory senses. However, as was discussed in an article entitled "The Visual System of Sharks: Adaptations and Capability" by Mr. Samuel H. Greber contained in the scientific journal American Zoologist, Volume 17, pages 453 through 469 and published in 1977, it appears that far from having poor vision this very successful marine predator apparently has a high degree of visual acuity.

The advent of World War II, however made it very clear that something more than red sashes and shark charmers was necessary if men were to survive in water without the benefit of lifeboats or life rafts. Thus, in 1944 the U.S. Navy came out with a book entitled "Shark Sense" which presumably provided information on how to deal with sharks. At that time and since, a great number of experimental chemical repellants have been tried with little or no success.

Physical techniques for discouraging sharks have also been tried and include fixed barriers, netting, steel enclosures and even armor. Such fixed barriers, of course, have the constant problem of having to be maintained, and, even so, will still eventually succumb to the wear and tear of the sea, and thus are costly. Air bubble curtains have been found to restrain some sharks but are completely ignored by other sharks. Perhaps the most effective beach barrier to date is called "meshing" which originated in Australia in 1937 and was then used in South Africa in 1952. A reference work by Stuart Springer and Terry W. Gilbert entitled "Sharks and Survival" published in 1965 by the D. C. Heath and Company suggests various ground rules to be considered in killing or repelling sharks. In particular, if the device is to be protective and worthwhile, it must be light in weight and easily carried. It must be operable under water and function either all of the time or when activated and in water. It must also be safe for the user to carry under any and all conditions including adverse conditions, and it should be reasonably effective in driving a shark away or in thwarting an attack. There is also another criteria, which although not essential would be highly desirable. This criteria is that the method or device is more useful when the user or target organisms need not be aware of the immediate presence of a shark. That is, the repelling nature of the device is constantly effective and requires little or no further consideration or input on the part of the user.

Attempts to meet some of these criteria have resulted in a number of complicated contraptions including the development of protective "shields." These devices basically comprise a life buoy from which a screen descends into the water to protect a floundering person in the open sea. For example, U.S. Pat. No. 3,222,701 issued to A. Fest on Dec. 14, 1965, discloses such a doughnut or toroidial shaped life buoy. When in operation a screen drops from the surface of the water from the life buoy to provide a shield around the seaman. Of course such a device requires time to employ and can only be protective if the shark is not particularly aggressive. Since the shield is not water impervious, it does not abate the spreading of olfactory stimuli and will be effective only if the shark is depending upon its visual sensory organs to find food. In a similar manner, U.S. Pat. No. 3,477,074 issued to B. S. Bezanis on Nov. 11, 1969 discloses a similar type device to that of Fest. Finally, one type of shark screen which does seem to have been successful was patented by C. S. Johnson on Feb. 5, 1969 as U.S.

Pat. No. 3,428,978. The difference in the Johnson screen and the previously discussed screens is that the Johnson screen is made completely of a water impervious material. Water is added to the inside of the screen while there is no communication of water surrounding the bather to the outside sea water. Thus, not only can the shark not see the individual in the shark screen preserver, but there are no smell, taste or other olfactory cues to reveal the presence of the individual to the shark. Unfortunately, in all of these screens, time is required to employ the device, and the individual's own movement is substantially curtailed such that the necessary activities which might otherwise be used by the individual to keep from drowning and attract help or attention are constrained.

Therefore, it is another object of this invention to provide a passive and inexpensive method of repelling or avoiding predatory animals which has an unlimited life span and which does not inhibit the other activities of the individual using the device.

Beyond physical barriers are disclosures that utilize coloration. As is well known, many animals have evolved certain characteristics which provide them camouflage in their natural surroundings. That is, these animals blend harmoniously with their surroundings such that they are often unnoticed unless they move. This approach is generally utilized to repel creatures, rather to hide them, though U.S. Pat. No. 5,588,251 (Young, Dec. 31, 1996) describes a passive method for protecting flying birds against the danger of colliding into transparent barriers. The method involves camouflaging the transparent barrier to resemble an image of the center portion of the web of an orb web building spider especially including in the image an adornment on the web known as the stabilimentum. The stabilimentum is known to be an advertisement by the spider for the purpose of deterring birds from flying into the web, an event which both animals wish to avoid. When the spider web image is placed on the transparent barrier, flying birds will take evasive action and thus avoid harmful collisions. Since the spider web image is mostly transparent, it does not block out a large portion of the transparent barrier.

In contrast to camouflaged animals, however, other animals have evolved effective defensive mechanisms or distinctly different color strategies which are exactly the opposite to that of camouflage. These animals are said to be "aposematic" and are readily identified by bright characteristic colors and other signals such that they seem to advertise their very presence. A proposal of this type is U.S. Pat. No. 4,494,245 (Burkhead, Jan. 22, 1985) which discusses techniques for repelling predatory animals by the use of aposematic patterns and coloration. The basis of this claim is the observation that many such aposematic animals survive longer than would be the case without possessing such aposematic attributes. This reason is typically that these types of animals have very dangerous or unpleasant attributes in that they are usually poisonous or very distasteful. These animals advertise this by means of characteristic colors and patterns such that a potential predator which is usually much larger avoids attacking them.

Most animals learn by experience to avoid aposematically patterned animals. However, such learning tends to occur when the predatory animal is young and is testing the palatability of a variety of potential prey. As a result, this method works well assuming that the protected individual encounters only previously experienced individual predators. Since this is not always the case in the long term, this is the shortfall of this technique.

In addition to those animals which are truly distasteful, poisonous or otherwise dangerous to the predator, there are often other harmless creatures which over a period of time have evolved color patterns such that they take advantage of the aposematic protection of the dangerous creatures. This is known as mimicry. Among the many examples of this implementation is the completely harmless King snake that has similar coloration patterns to that of the deadly poisonous Coral snake. As noted, some disclosures follow this class of repellant scheme.

Mimicry is not limited to resembling other poisonous species. To avoid predation, some butterflies are marvelously convincing mimics of leaves, even folding their wings together when at rest so the markings on their undersides look like leaf veins. This concept is used considerably in hunting and military camouflage but has not been seen in shark repellant inventions.

This disclosure is based upon another class of animal mimicry which causes the instinctual startle response in the predator. In a preferred embodiment the animal repelled would be a shark.

A classic example of this approach is the observation that many butterflies and moths have evolved paired markings that resemble eyes to initiate the startle response in their predators. These may be paired on hind wings and closely resemble owl's eyes, complete with oval pupils and owlish highlights. Hidden when the moth is at rest, the sudden flash of the eyes startles approaching would-be predators, giving the insect time to escape. These species do not taste bad nor are they poisonous, but rather they rely on a sudden display of their large vertebrate-like eyespots to startle predators. Experiments have shown that some birds and fish have an innate fear of such large eye-like patterns and it is likely that most wild animals, while trying to survive the unending onslaught of a violent and brutal existence, share that fear especially when they learn as youngsters from their mother or siblings to avoid certain animals the look of which is generally imprinted into memory for future warnings.

The concept is to activate this startle or memorized response in the predator to beware. For a foraging shark searching for food, if an eye suddenly appears peering directly at it from a short and unknowable distance, it could mean a killer whaler is close enough to strike, and it would invoke the response to flee.

Natural selection has hard-wired into predators and prey to instantly flee when they see that eye staring back. Thus the viewing animal "startles" and swims, jumps, flys, leaps, and/or falls away from where they are located. If they allow a millisecond to contemplate whether it is giant squid, a sea snake, orca, falcon, monkey, or cat, or caterpillar, they can easily be overcome. Since the wrong decision may only happen once, a repelled predator such as a shark is unlikely to return to investigate the true nature of the threat and risk being eaten.

Visual mechanics are on the side of the prey especially under water. The foraging predator will most commonly first see the prey's false eye(s) through one eye or the other. As a result, it is almost impossible for the predator to determine if an eye is a 10 mm diameter harmless eye at a distance of 30 cm, or a 30 mm diameter dangerous eye at a lethal distance of 90 cm. Further, with one visual field it will be hard to see the 3-D traits that could help distinguish a predator's actual face from an eye spot mimic though our disclosure can utilize them.

The color and pattern antecedents for false eyes lie in the camouflage and warning colors found throughout fish, reptiles, insects, caterpillars and pupae included, and in serendipituously eye-shaped structures such as spiracles. It appears that there is not so much a selection driving a false eye to match some particular real eye, as is often the case with Batesian and Mullerian mimicry (where there is selection to match a specific model). Instead, many kinds of false eyes will suffice if they are sufficiently "eye-like" in general appearance to elicit the startle/flight response that all vertebrates must have if they are to survive for decades in a predator-rich world. Startle mimicry functions not only through learning by the predator in its youth, but also through expression of genetic programming somewhat analogous to the genetic programming that leads a bird to avoid a bright-colored ringed coral snake and its models. Why do eye spots work? A number of theories exist in this area. First, it is thought they may startle predators. Moths often keep them hidden until startled and wings are opened fully. A second theory is that it may confuse predators into thinking anterior is posterior or vice versa, allowing the animal to escape or to have the predator strike away from the head. A further thesis is that it may make the animal look like something bigger and better left alone; for example, a caterpillar that has huge eye spots making it look like a snake resting.

Other research into the effects of eye spots have indicated the following: (1) Eye spots really can startle predators. Birds will be startled by and avoid moths with eyespots. They will eat these same moths much more readily if the eyespots are covered over artificially. (2) Large eye spots work best. Small eye spots can even encourage predators to strike.

When the butterfly opens its wings to an approaching predator, the eyespots suddenly come into view. This may simulate the large and menacing face of an animal dangerous to the would-be predator. Some species of hawk-moths can puff themselves and display their false eyes to appear remarkably like a snake, complete with hissing noise.

False eyespots are not limited to butterflies and moths. Caterpillars with false eyes can tuck in their heads and look convincingly like a menacing face with eyes. The false-eyed frog of South America has two large eyespots on his tail end. When threatened, this frog will bury its head in the sand and stick its large rump in the air displaying a fierce false face to the oncoming danger.

Most predators key visually on eyes of their prey, making an effort to approach the prey from a direction where they won't be seen. There is a distinct advantage to any prey that can fool the predator into approaching from the wrong end—the one with real eyes that will see the predator and trigger a timely escape. Many fish have a conspicuous false eyespot on or near their tail fins. When a predator approaches from the "rear", the prey fish is fully aware of the danger, and it escapes in the exact opposite direction to that expected. Some insects have entire false heads with conspicuous false eyes at their tail ends, which utterly confuses an approaching predator.

With respect to the above description, before explaining at least one preferred embodiment of the invention in detail, it is to be understood that the invention is not limited in its application to the details of construction and to the arrangement of the components or steps set forth in the following description or illustrated in the drawings, nor just to shark repellence. The various apparatus and methods of the invention are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other devices, methods and systems for carrying out the several purposes of the present disclosed device. It is important, therefore, that the objects and claims be regarded as including such equivalent construction and methodology insofar as they do not depart from the spirit and scope of the present invention.

Further objectives of this invention will be brought out in the following part of the specification, wherein detailed description is for the purpose of fully disclosing the invention without placing limitations thereon.

SUMMARY OF THE INVENTION

After much research and study of the above noted problems, the present invention has been developed to provide an economical, effective and humane means and method of repelling rapacious predators like sharks by initiating the creature's instinctual startle response. In the case of sharks, an initial proposed version of the above providing that capability is accomplished through the provision of a swimming fin with a screened, printed, appliqued or otherwise applied example of a representation of an eye ball of a killer whale or other animal feared by sharks and selected associated eye components such as eyebrows or other markings upon each swim fin, potentially with 3-D accents. The representation could contain or consist of reflective, refractive or holographic components to assist in the illusion. As noted above, it is the object of the invention to provide a repelling means based on the startle response of animals which is ecologically sound and not hazardous to man, other creatures or the environment.

Several additional objects of the invention are to be light in weight and easily carried. In the case of underwater predators such as sharks, the device must be operable under water and function either all of the time or when activated and in water. Further, the device must also be safe for the user to carry under any and all conditions including adverse conditions, and it should be reasonably effective in driving the chosen predator such as a shark away or in thwarting an attack. Further, the repelling nature of the device should be constantly effective and once applied require little or no further consideration or input on the part of the user.

BRIEF DESCRIPTION OF DRAWING FIGURES AND ITEMS

Item numbers noted in the associated drawings:
10—the produced device as described above
13—surrounding facial coloration
12—the swim fin
14—the eyes as applied to the sports item.
16—an eye provided as an adhesive add on for user owned swim fins or equipment
18—the adhesive backing for item 16 above
20—an example of a boogie board
22—an example of a wetsuit
24—an example of a t-shirt
26—an example of a pair of pants.
28—an actual example of a killer whale eye
30—a stylized example of a killer whale eye
32—a stylized example of a cougar eye
34—an example of a surfboard 36—a skeg
38—an example of a backpack

BRIEF DESCRIPTION OF THE ASSOCIATED DRAWINGS

FIG. 5 is another example of a preferred embodiment of the device depicting a user attachable depiction of a predator eye for end user installation to the product intended.

FIG. 7 depicts a view of the device showing the predator eye affixed to clothing such as a shirt.

FIG. 10 is a view of another preferred embodiment of the device as placed on a backpack.

DETAILED DESCRIPTION OF PREFERRED EMBODIMENTS OF THE DISCLOSED DEVICE

Figure 4:
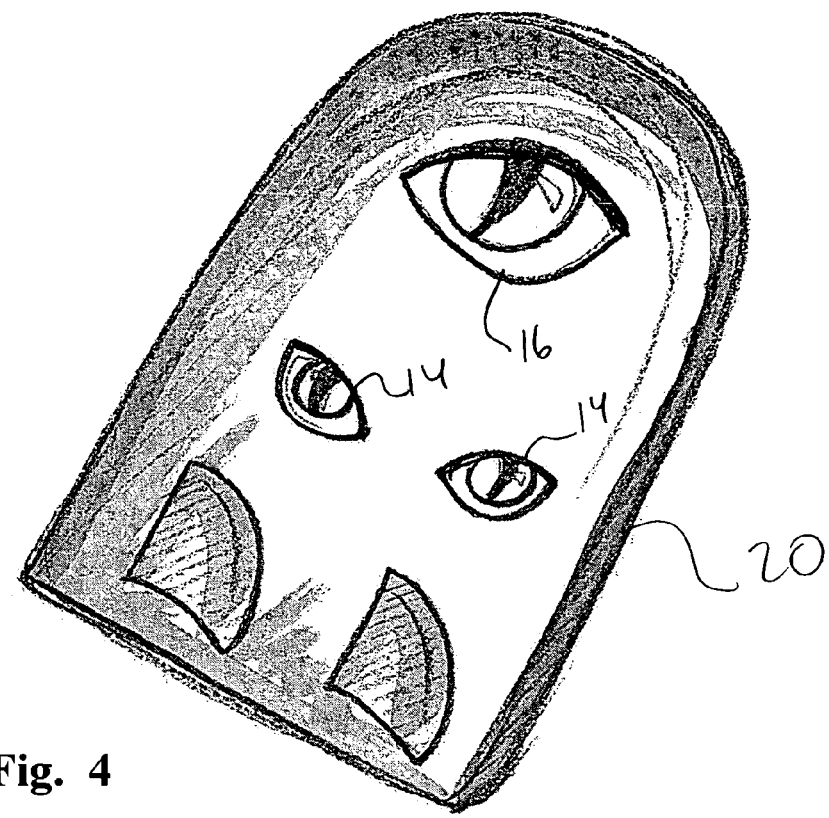
FIG. 4 is a view of a boogie board with both the factory and end user applied versions of the predator eye on the underside.

Referring now to the drawings, FIGS. 1–10 disclose several of the preferred embodiments of the disclosed predator repellant in the form of eyes of a shape and rendering and positioned to startle the chosen predator. In some cases, portions of the face of the predator might also be included such as the large white spot on black skin generally situated behind the eye of a killer whale.

Figure 1:
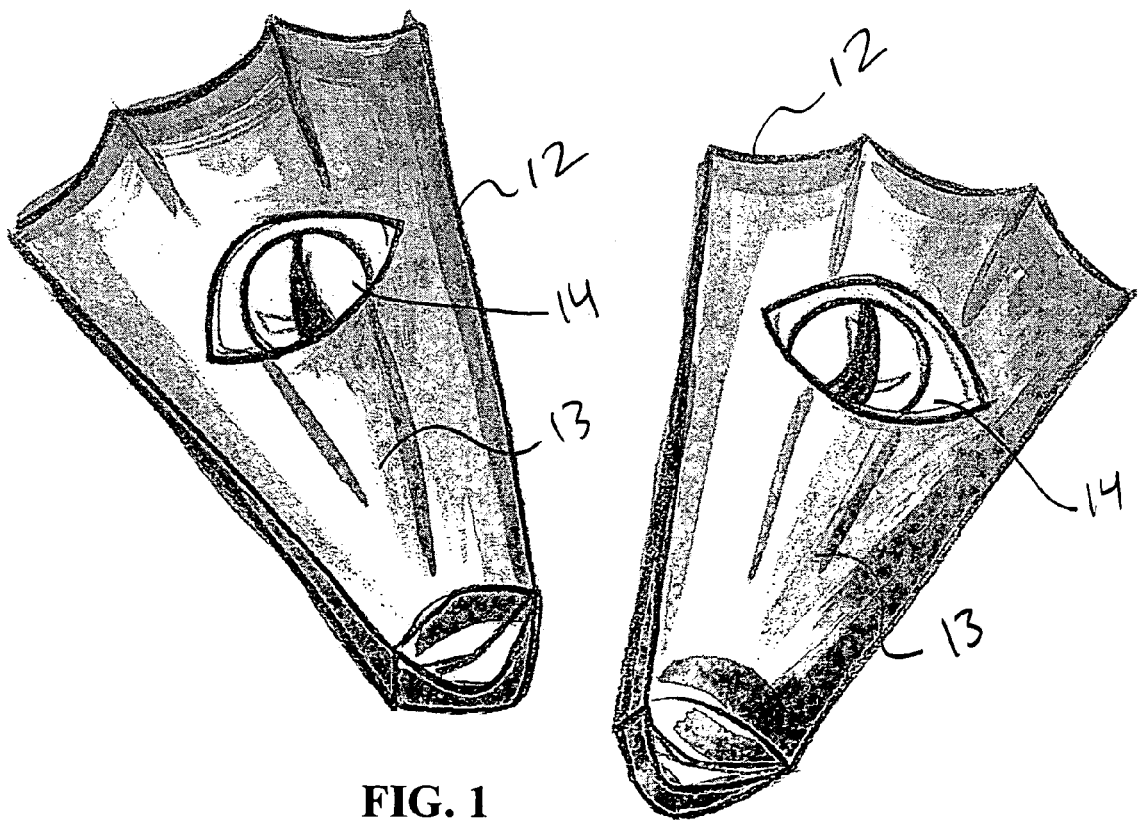
FIG. 1 is an example of a preferred embodiment of the device and method showing a set of swim fins emblazoned with the killer whale eye depiction.

Referring now to FIG. 1 there is shown a pictorial drawing illustrating rendition of this invention as would be used on a diver's swim fins 12 in an aqua marine environment for the purpose of repelling or avoiding an aquatic predator such as sharks. As displayed in this embodiment each fin 12 has an eye 14 affixed to one surface. The eyes 14 may be applied through the process of manufacture or through user modification using an aftermarket provided kit of an eye decal or patch and appropriate means of attachment. It will be appreciated that the pattern coloration of large eyes 14 on the swim fins 12 simulates to the shark the natural appearance and coloration of the very startle inducing killer whale eye. Of course other aquatic predators may be startled by a differently depicted eye 12 depending on their personal predators or dislikes and it is anticipated in this patent that other eye types and patterns can be placed on the fins or clothing or articles carried by or employed by the user to scare away other types of predators. Further, as noted above, in the case of all embodiments, portions of the surrounding facial coloration 13 might also be included if it is determined that the eyes and the facial coloration are what a specific predator dislikes or is startled by.

Figure 2:
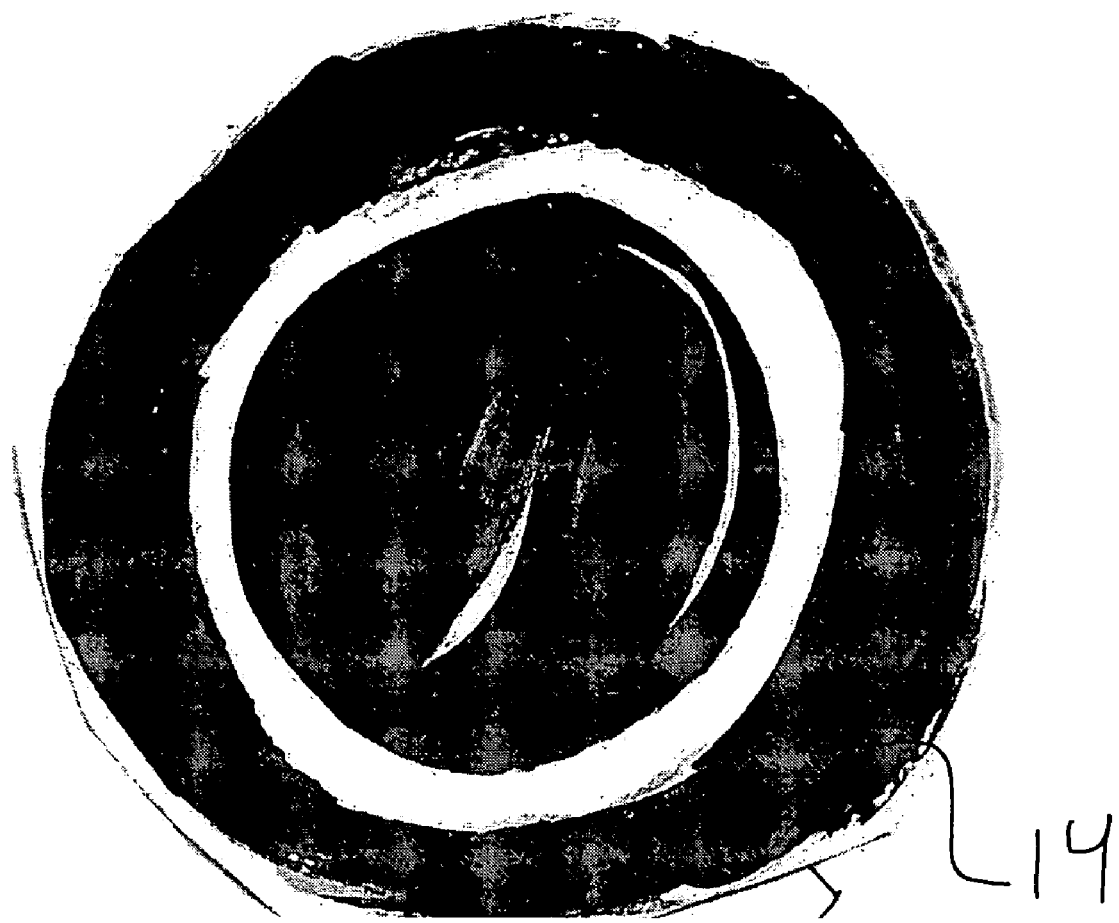
FIG. 2 is a stylized version of an aquatic predator similar to a killer whale eye.
Figure 3:
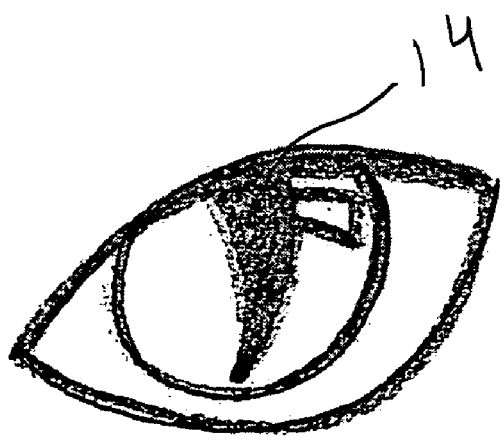
FIG. 3 is a stylized version cat-type land predator such as a cougar eye.

FIG. 2 depicts an embodiment of the eye 14 which is very similar to a killer whale eye that would dissuade sharks and FIG. 3 shows an eye that when viewed depicts an eye 14 similar to that of a cat. As noted above, the eye art or rendition best suited to dissuade the predator intended should be used on the article of clothing, sports equipment, tent, backpack or other equipment that the used will have on their person when entering a predator's domain. Further, in the case of animals having distinctive coloration around their eyes such as a killer whale eye depiction, the white spot and black face coloration 13 might also be included with the eye since in the natural aquatic environment such a distinctive face depiction might further enhance the device's performance in dissuading predators.

FIG. 4 is a view of a boogie board 20 with both the factory applied eye 14 and end user applied eye 16 affixed to one side, preferably the underside which is the side viewed by an aquatic predator when the user is sitting upon the boogie board 20 in the water. Of course one or a plurality of the eyes may be affixed to one side of the board and as noted above, the dissuading eye art can be affixed to any number of aquatic devices such as surfboards, sail boards, or the like.

FIG. 5 depicts example of a preferred embodiment of the device depicting a user attachable eye 16 in the form of a decal or sticker 17 that would be provided with adequate means of attachment such as adhesive 18 on the back side of the eye depiction on the front surface. Employing this version of the device, the user would choose the eye art best suited to startle the intended predator to be encountered and affix the attachable eye 16 to the component or clothing to be used in the environment of the predator. Also, this embodiment of the disclosed device may be provided in a kit form having a plurality of different renditions of eyes available to the user from which to choose. In the case of aquatic predators it can be placed on the fins or wetsuit or water board or other component. In the case of land predators such as bears, the appropriate dissuading eye for a bear would be affixed to a backpack 38, tent, article of clothing, or somewhere the predator is likely to encounter it.

Figure 6:
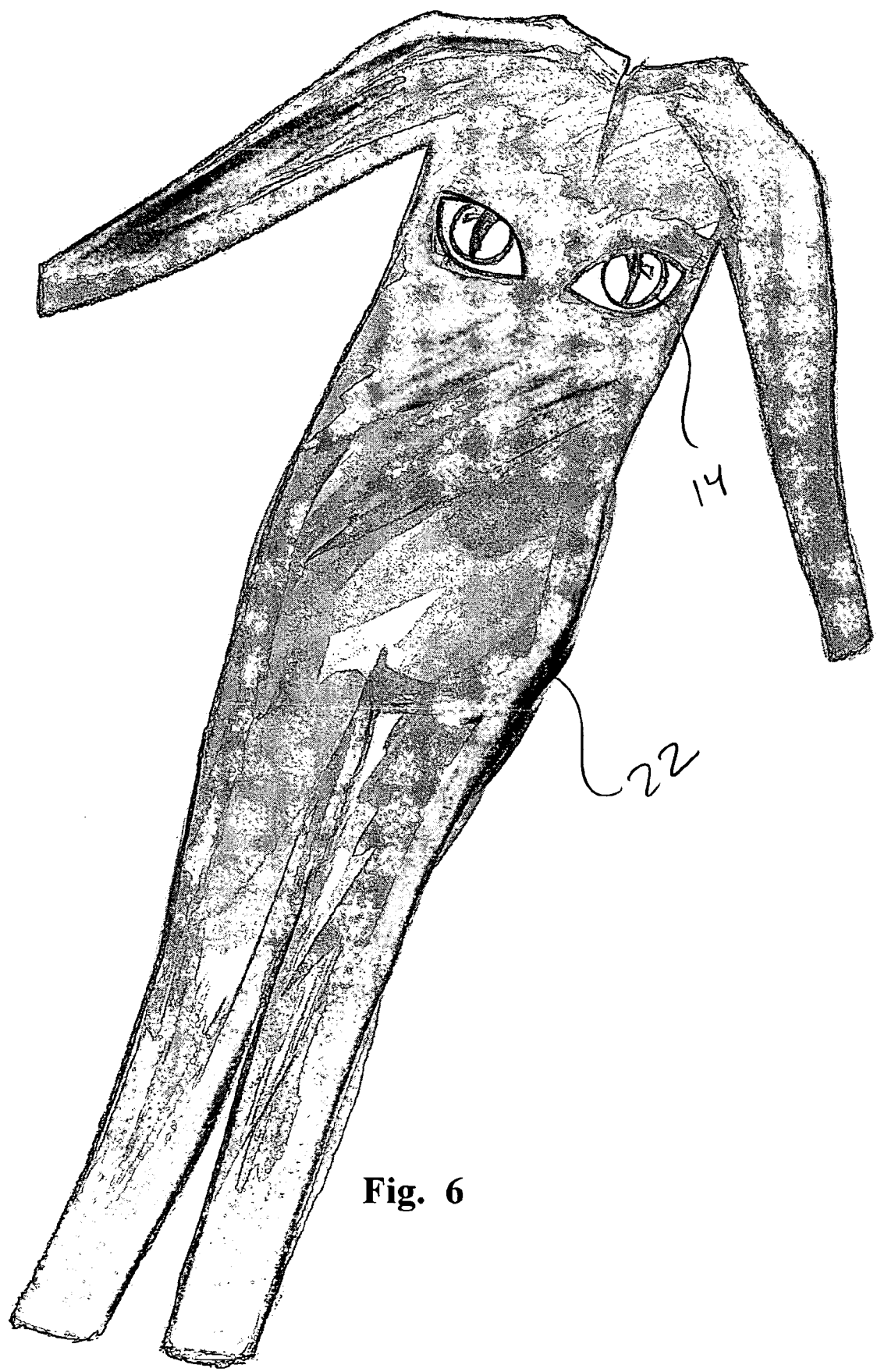
FIG. 6 is a view of another preferred embodiment of the device as applied to a wet suit.

FIG. 6 is a view of another preferred embodiment of the device as applied to a clothing such as a wet suit 22.

FIG. 7 is a view of another preferred embodiment of the device as applied to a shirt 24.

Figure 8:
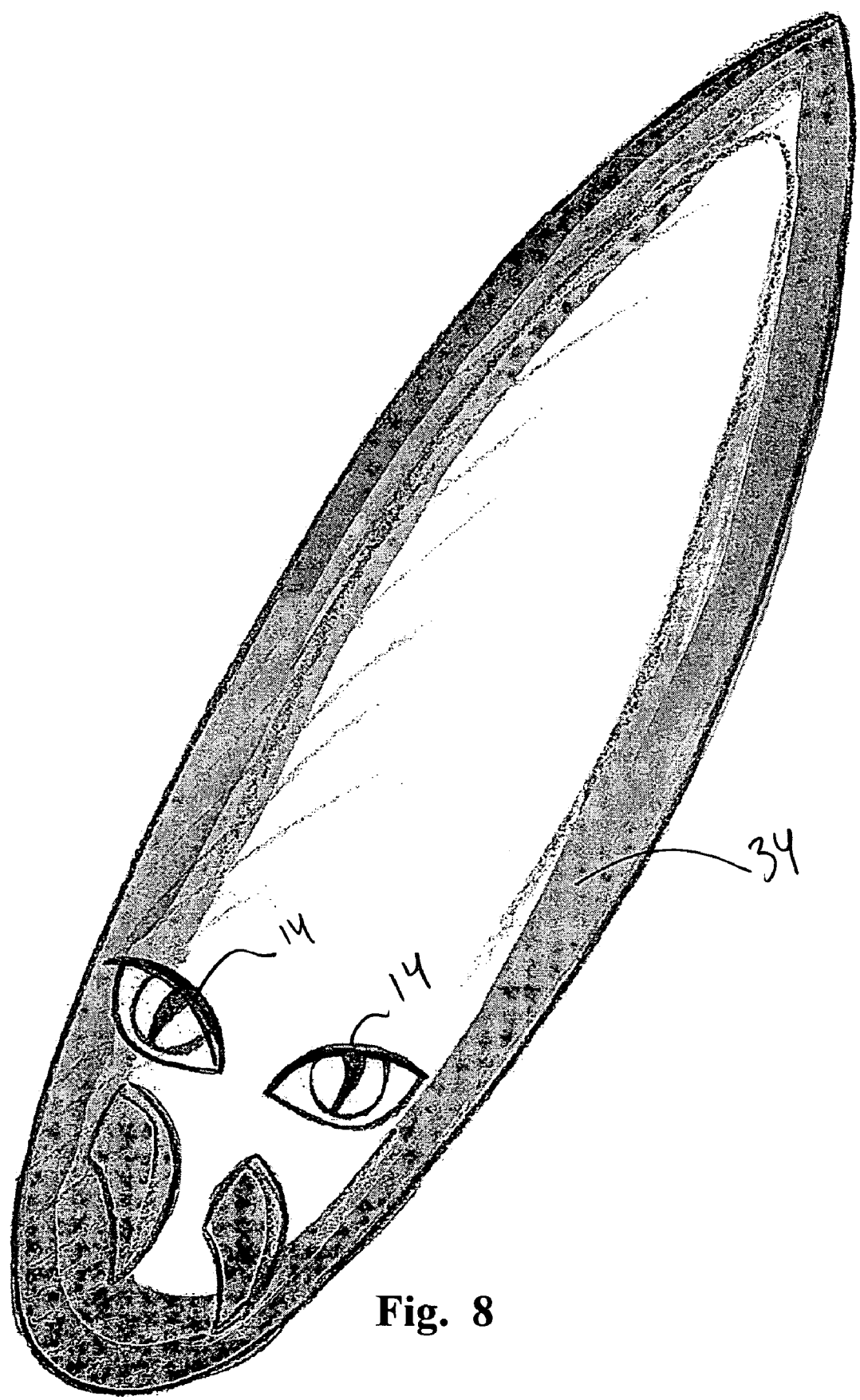
FIG. 8 is a view of another preferred embodiment of the device as applied to a surfboard.

FIG. 8 is a view of another preferred embodiment of the device as applied to a surfboard 34.

Figure 9:
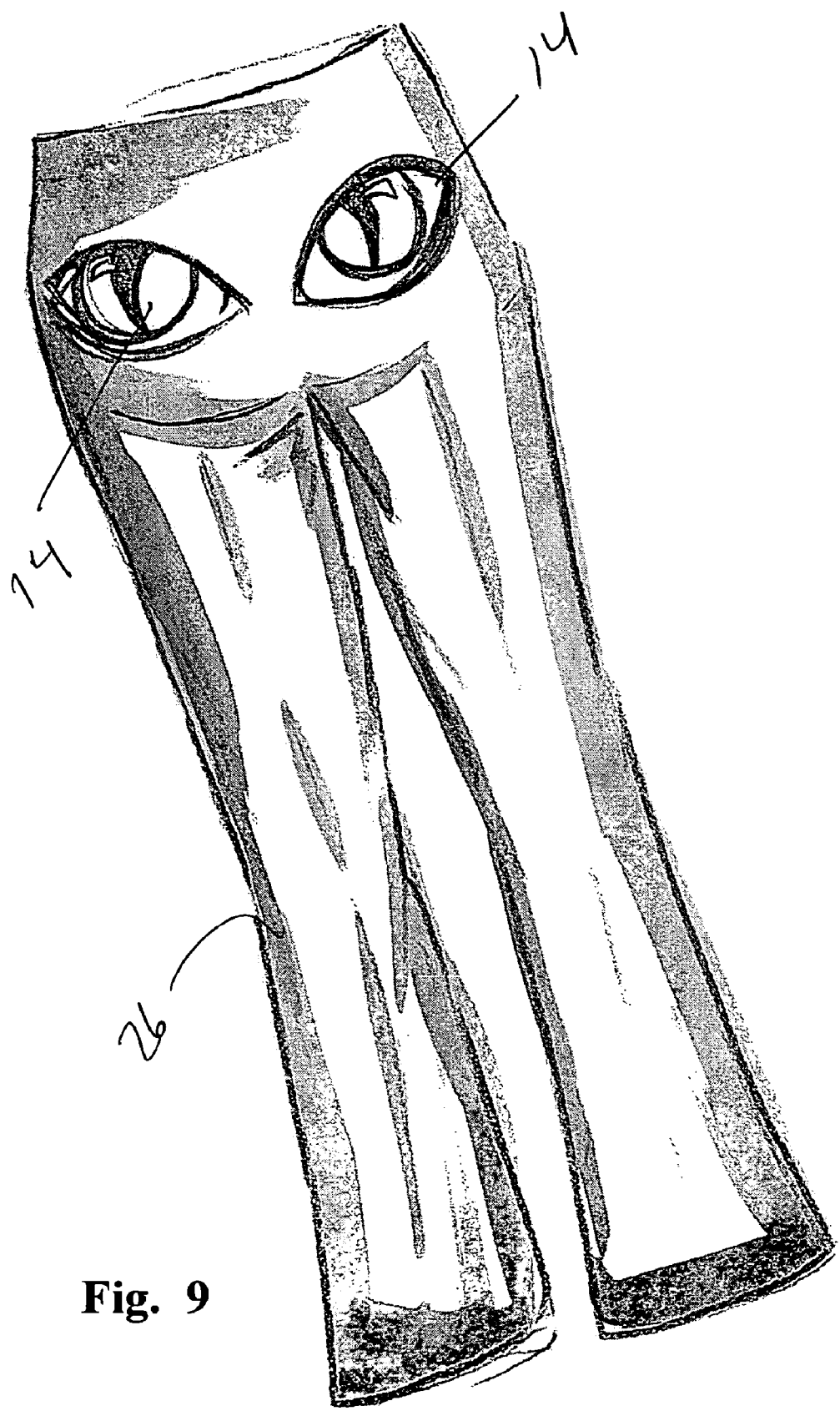
FIG. 9 is a view of another preferred embodiment of the device showing the chosen eyes applied to pants.

FIG. 9 is a view of another preferred embodiment of the device as applied to pants 26.

FIG. 10 is a view of another preferred embodiment of the device as placed on a backpack 38.

In the case of a method, the user would take the steps of determining the possible predator which might be encountered in the environment to be entered by the user and placing a rendition of an eye upon clothing or equipment being carried into the living environment of the predator. Alternatively, the extra step of determining a rendition of an eye that specifically discourages or scare a specific intended predator and then affixing that chosen specific rendition of an eye to an article of equipment or clothing to be employed by the user in the living environment occupied by the intended predator and being entered by the human.

Although the invention has been described with respect to particular embodiments thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and method of operation of the present invention, it is to be understood, however, that elements of different construction and configuration and other arrangements thereof, other than those illustrated and described, may be employed in accordance with the spirit of this invention. Any and all such changes, alternations and modifications, as would occur to those skilled in the art, are considered to be within the scope of this invention as broadly defined in the appended claims.

Further, the purpose of the attached abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A swim fin for dissuading human predators comprising:
   said swim fin having a blade with a width and an area; a depiction of an eye
   means of attachment of said depiction of an eye to said swim fin blade;
   said depiction of said eye having a width and an area;
   said width of said depiction of said eye being at least half the width of said swim fin blade and said area of said depiction of said eye covering a significant portion of said swim fin blade; and
   said swim fin with said depiction thereon providing means to dissuade said human predators when taken into a human predator's living environment, whereby said depiction of said eye, when attached to said swim fin and encountered by said human predator, will startle said human predator and dissuade attack.

2. The swim fin for dissuading human predators of claim 1 further comprising:
   said human predator being a shark; and
   said a depiction of said eye being a depiction of an eye of a killer whale.

3. The swim fin for dissuading human predators of claim 1 further comprising:
   said swim fin being supplied as a kit; and
   said kit having a plurality of different renditions of said depiction of said eye, whereby a human user may choose one said depiction of said eye from any of said different renditions of said kit and attach it to said swim fin using said means of attachment of said depiction of an eye to said swim fin blade.

* * * * *